UNITED STATES PATENT OFFICE.

JAMES ALEXANDER MANNING, OF LONDON, ENGLAND.

IMPROVEMENT IN PROCESSES FOR MANUFACTURING FERTILIZERS.

Specification forming part of Letters Patent No. 122,773, dated January 16, 1872; antedated December 30, 1871.

*To all whom it may concern:*

Be it known that I, JAMES ALEXANDER MANNING, of the city of London, in England, have invented a new and useful Improvement in Process for Manufacturing Land-Fertilizers; and I do hereby declare that the following is a full, clear, and exact description thereof, which will enable others skilled in the art to make and use the same.

This invention has for its object the collection and conversion into manure of night soil or solid and fluid human excreta, and the general wastes, of towns and cities and other densely populated localities, of animal and vegetable origin containing elements of fertility, by the addition of bones or soluble phosphate of lime, in the required proportion for a highly-concentrated manure equal to guano in its percentage of ammonia and superior to guano in its durable effects upon the soil. It also consists in preserving the whole of the ammonia contained in the coal consumed in the process, and also the carbureted hydrogen evolved by the combustion of the fuel used.

In carrying out my invention I do not limit myself to any particular mode of collecting the night-soil and wastes above referred to, but I discharge the contents of vaults and cess-pits by means of a pump and hose into a closed chamber beneath a portable furnace, so that the gases will be compelled to pass upward through the grate-bars, whereby all offensive smell is destroyed. Movable tanks or barrels may be employed and removed at stated intervals. In either case or in any mode of collection the matters collected are treated chemically in the cess-pits or barrels, so that the whole of their nitrogen or ammonia shall be entirely fixed and preserved, and the fermentation of the liquid portion prevented, as such fermentation converts all the different forms of ammonia found in both the solid and liquid excreta into carbonate of ammonia, the most volatile of all forms of that salt, and which, being constantly evolved into the atmosphere, causes a loss of at least two-thirds of that valuable ingredient during the period that the matter is generally allowed to remain in the cess-pit.

For the purpose of preventing this loss to agriculture I employ sulphuric acid in the proportion of about five pounds of acid to every hundred pounds of fluid and solid matter. Other substances may be added as disinfectants and deodorizers. The contents of the cess-pits are discharged into evaporating cisterns or tanks, of any convenient shape and size. These evaporating-tanks or cisterns are constructed with return-flues for the passage of the products of combustion from the furnace over or in contact with the contents of the tanks, by which means an elevated temperature is produced in the tank or cistern as well as around it.

The vapors arising from the evaporation, as well as the smoke and gaseous products of combustion, are drawn into or forced into a separate vessel by means of a fan-blower, the said vessel being arranged and constructed so that the vapors may be condensed therein. The carbureted hydrogen-gas is passed into a purifier, and from thence to a gas-holder, where it may be stored for illuminating purposes. The water of condensation retained in the condensing-vessel or receiver forms a weak solution of ammonia, which is drawn off and treated in the ordinary manner for the manufacture of sulphate of ammonia, which may be added to the manure.

While the contents of the evaporating-tank are being subjected to the action of heat for reducing them to the condition of a dry powder, mechanical stirrers or agitators may be employed in the said tanks.

The product thus obtained will be a fertilizer in the most concentrated form, and may be combined with the ashes of vegetable matter and with other substances for increasing the percentage of alkali or other purposes.

Having thus described my invention, I claim as new and desire to secure by Letters Patent—

The above-described process for the manufacturing of a land-fertilizer, substantially as set forth.

The above specification of my invention signed by me this 5th day of June, 1871.

JAMES ALEXANDER MANNING.

Witnesses:
S. C. TANSA,
GEO. WEBB,
*Clerks to Ridgway Brothers,*
*Notaries, 28 Royal Exchange, London.*